US010694435B2

(12) United States Patent
Sivakumar et al.

(10) Patent No.: US 10,694,435 B2
(45) Date of Patent: *Jun. 23, 2020

(54) SEAMLESSLY HANDING OVER CHANNEL RESOURCES AMONG USER EQUIPMENT

(71) Applicant: International Business Machines Corporation, Armonk, NY (US)

(72) Inventors: Gandhi Sivakumar, Melbourne (AU); Rajan Dilavar Mithani, Pune (IN); Sandeep R. Patil, Pune (IN); Sasikanth Eda, Vijayawada (IN); Abhishek Jain, Baraut (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/353,945

(22) Filed: Mar. 14, 2019

(65) Prior Publication Data

US 2019/0394689 A1 Dec. 26, 2019

Related U.S. Application Data

(63) Continuation of application No. 16/015,063, filed on Jun. 21, 2018, now Pat. No. 10,321,368.

(51) Int. Cl.
*H04W 16/10* (2009.01)
*H04W 36/00* (2009.01)
(Continued)

(52) U.S. Cl.
CPC ....... *H04W 36/0072* (2013.01); *H04W 36/06* (2013.01); *H04W 36/18* (2013.01);
(Continued)

(58) Field of Classification Search
CPC ..... H04W 16/00; H04W 16/02; H04W 16/04; H04W 16/06; H04W 16/10; H04W 16/12
See application file for complete search history.

(56) References Cited

U.S. PATENT DOCUMENTS 9,042,345 B2 * 5/2015 Brandt ............. H04W 36/0055
370/331
9,445,323 B1 * 9/2016 Ramamurthy .... H04W 36/0033
(Continued)

FOREIGN PATENT DOCUMENTS

WO 2016099359 A1 6/2016

OTHER PUBLICATIONS

Simpletechpost, "All about Wired and Wireless Technology," 2017, 11 pages retrieved from http://www.simpletechpost.com/.
(Continued)

*Primary Examiner* — Christopher M Brandt
(74) *Attorney, Agent, or Firm* — Zilka-Kotab, P.C.

(57) ABSTRACT

A computer-implemented method, according to one embodiment, includes: receiving, by the computer, information. The information that is received includes: an expiry time which corresponds to a communication request, and communication resources associated with the communication request. The communication resources further include a channel and/or a spectrum band which correspond to the communication request. The expiry time is packaged with the communication resources by the computer. Furthermore, the packaged expiry time and communication resources is passed, by the computer, to devices which correspond to each of one or more identities associated with the communication request. Other systems, methods, and computer program products are described in additional embodiments.

20 Claims, 6 Drawing Sheets

(51) Int. Cl.
*H04W 72/04* (2009.01)
*H04W 36/06* (2009.01)
*H04W 36/36* (2009.01)
*H04W 36/18* (2009.01)
*H04W 76/10* (2018.01)

(52) U.S. Cl.
CPC ....... *H04W 36/36* (2013.01); *H04W 72/0446* (2013.01); *H04W 72/0453* (2013.01); *H04W 76/10* (2018.02)

(56) References Cited

U.S. PATENT DOCUMENTS

| 10,321,368 | B1 | 6/2019 | Sivakumar et al. |
| 2007/0123284 | A1 | 5/2007 | Schliwa-Bertling et al. |
| 2013/0315181 | A1 | 11/2013 | Song et al. |
| 2015/0016334 | A1 | 1/2015 | Byun et al. |
| 2016/0081117 | A1* | 3/2016 | Morioka ........... H04W 52/0216 370/336 |
| 2018/0160418 | A1* | 6/2018 | Luo ....................... H04W 72/04 |

OTHER PUBLICATIONS

Rouse, M., "cognitive radio (CR)," TechTarget, Search Networking, 2008, 4 pages retrieved from https://searchnetworking.techtarget.com/definition/cognitive-radio.

Saunamaki, J. "Nokia Research Center presents Cognitive Radio," YouTube, 2011, 4 pages retrieved from https://www.youtube.com/watch?v=20wqZZaXG9o.

Sivakumar et al., U.S. Appl. No. 16/015,063, filed Jun. 21, 2018.

Notice of Allowance from U.S. Appl. No. 16/015,063, dated Jan. 30, 2019.

Corrected Notice of Allowance from U.S. Appl. No. 16/015,063, dated May 13, 2019.

List of IBM Patents or Patent Applications Treated as Related.

* cited by examiner

SEAMLESSLY HANDING OVER CHANNEL RESOURCES AMONG USER EQUIPMENT

BACKGROUND

The present invention relates to communication networks, and more specifically, this invention relates to transferring channel resources among user equipment (UE) connected to a wireless data communication network.

Wireless data communication network technology, such as 4G broadband cellular network technology, provides an architecture which allows for communication between various types of UE having wireless functionality. For instance, mobile devices which are coupled to a wireless data communication network are able to transfer information between each other in the form of text messages, voice (phone) calls, emails, etc. Moreover, data communication network standards, such as Long-Term Evolution (LTE), provide a common standard which different technologies may adhere to in order to facilitate a unified front for further development.

Under general circumstances, UE which attaches to a wireless data communication network to perform a given task is assigned a default bearer having a set of network parameters which determines how information sent from and/or to the UE is processed. For conventional data communication network technology, this bearer assignment process is static. Thus, once the task has been completed and/or the corresponding processes have been terminated, the bearer is de-allocated and returned to a pool, thereby subjecting the bearer re-allocation process to network and/or system delays.

SUMMARY

A computer-implemented method, according to one embodiment, includes: receiving, by the computer, information. The information that is received includes: an expiry time which corresponds to a communication request, and communication resources associated with the communication request. The communication resources further include a channel and/or a spectrum band which correspond to the communication request. The expiry time is packaged with the communication resources by the computer. Furthermore, the packaged expiry time and communication resources is passed, by the computer, to devices which correspond to each of one or more identities associated with the communication request.

A computer program product, according to another embodiment, includes a computer readable storage medium having program instructions embodied therewith. The program instructions are readable and/or executable by a processor to cause the processor to: perform the foregoing method.

A computer-implemented method, according to yet another embodiment, includes: identifying, by the computer, a context of a communication request by analyzing contextual information that is associated with the communication request. Moreover, the context of the communication request is used, by the computer, to calculate an expiry time which corresponds to the communication request. One or more identities are which correspond to the communication request are identified by the computer. Furthermore, the identified one or more identities and the expiry time are sent, by the computer, to a base station.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a", "an", and "the" include plural referents unless otherwise specified. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products which improve the efficiency by which communication requests are satisfied, not only in terms of performance-based data, but also in terms of network resources consumed in the process of doing so. According to some approaches, these improvements may be accomplished by packaging communication resources along with expiry information which are seamlessly handed-over to different UE having related contextual information in a wireless data communication environment. Moreover, these improvements are achieved as a result of predicting future demands, and preemptively allocating communication resources in correspondence with such predictions, e.g., as will be described in further detail below.

In one general embodiment, a computer-implemented method includes: receiving, by the computer, information. The information includes: contextual information associated with a communication request, an expiry time which corresponds to the communication request, one or more identities corresponding to the communication request, and communication resources associated with the communication request. Furthermore, the communication resources include a channel and/or a spectrum band which correspond to the communication request. The expiry time is packaged, by the computer, with the communication resources. Moreover, the packaged expiry time and communication resources are passed, by the computer, to devices corresponding to each of the one or more identities.

In another general embodiment, a computer-implemented method includes: initiating, by the computer, a communication request; collecting, by the computer, contextual information associated with the communication request; and identifying, by the computer, a context of the communication request by analyzing the contextual information. The context of the communication request is used, by the computer, to calculate an expiry time which corresponds to the communication request. Moreover, one or more identities which correspond to the communication request are identified by the computer. The contextual information, the identified one or more identities, and the expiry time are sent, by the computer, to a base station.

In yet another general embodiment, a computer program product includes a computer readable storage medium having program instructions embodied therewith. The computer readable storage medium is not a transitory signal per se. Moreover, the program instructions readable and/or executable by a processor to perform a method which includes: receiving, by the processor, information from user equipment. The information includes: contextual information associated with a communication request, an expiry time which corresponds to the communication request, one or more identities corresponding to the communication request, and communication resources associated with the communication request. Moreover, the communication resources include a channel and/or a spectrum band which correspond to the communication request. The expiry time is packaged, by the processor, with the communication resources. Furthermore, the packaged expiry time and communication resources are passed, by the processor, to devices corresponding to each of the one or more identities.

Figure 1:
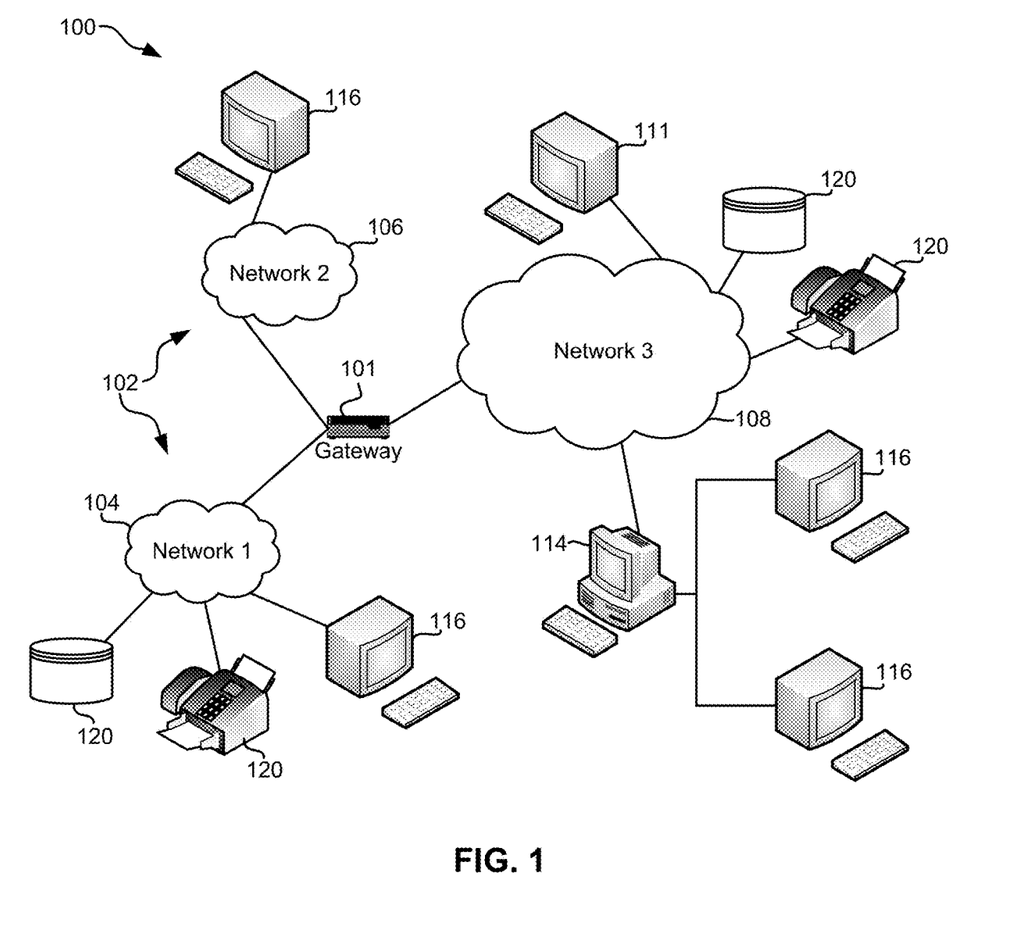
FIG. 1 is a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
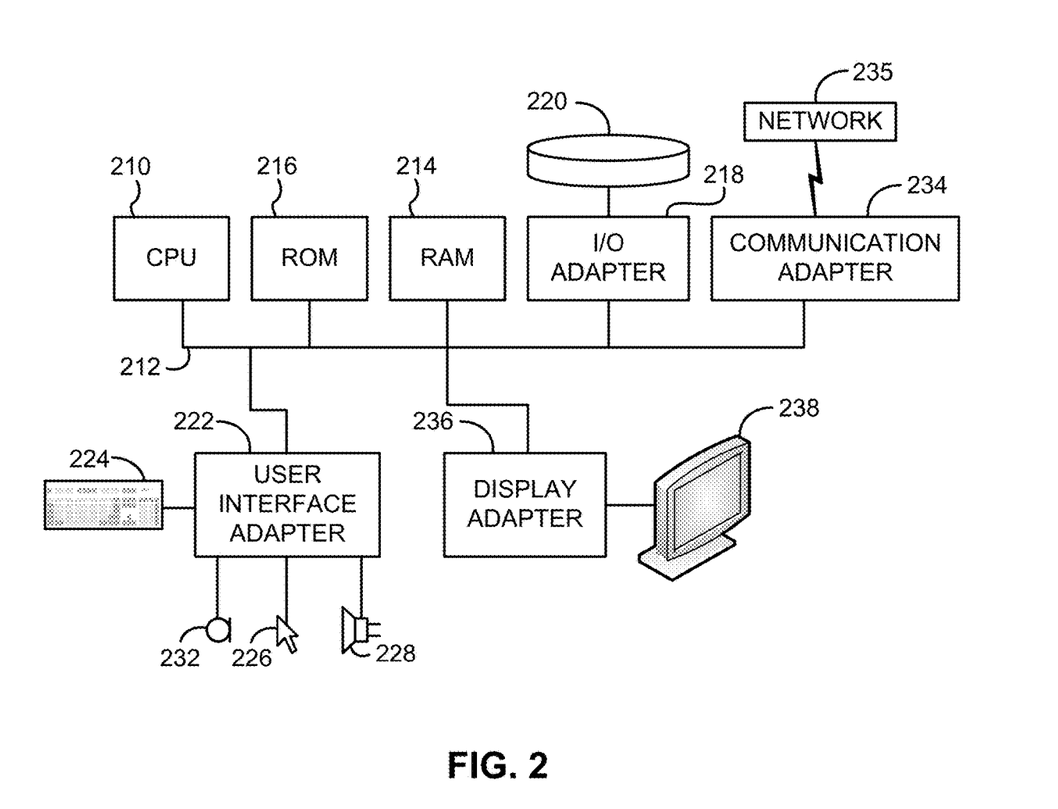
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3A:
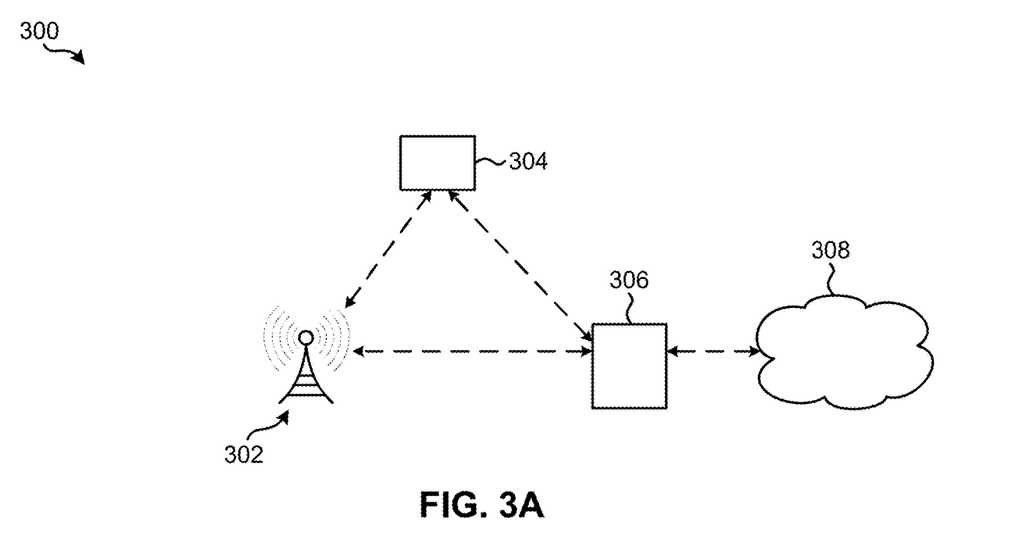
FIGS. 3A-3C are partial representational views of a wireless data communication network, in accordance with one embodiment.
Figure 3B:
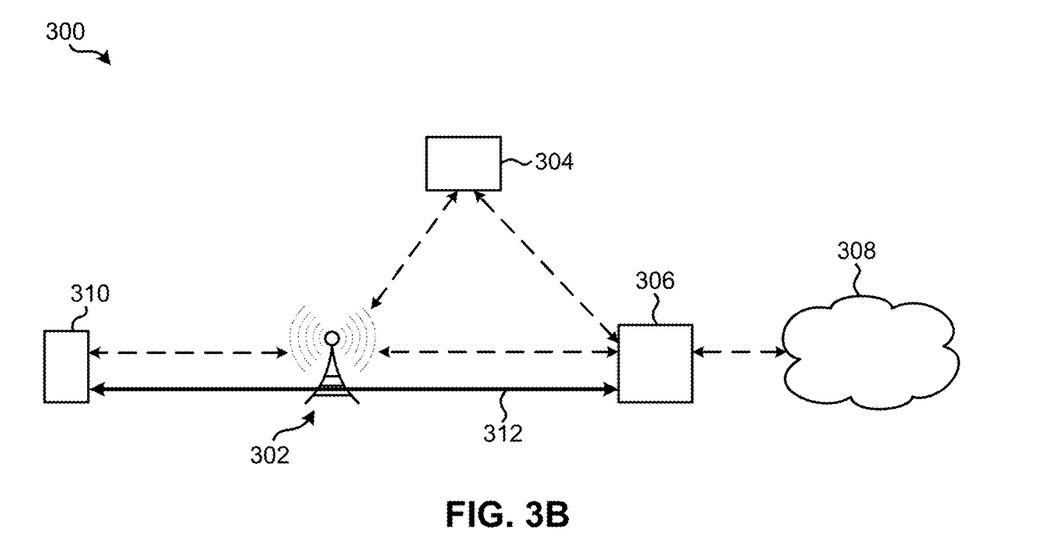
Figure 3C:
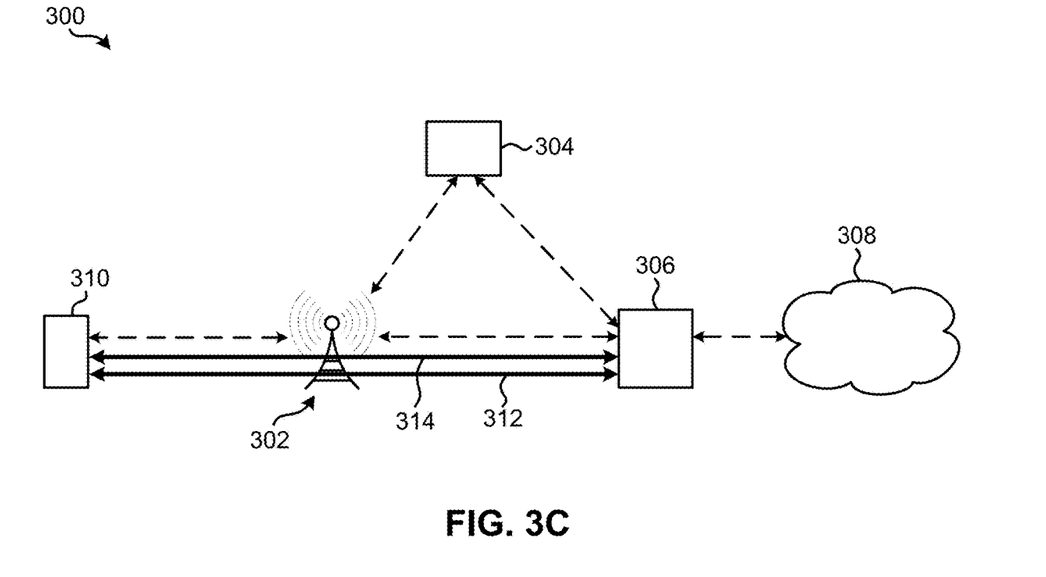

Now referring to FIGS. 3A-3C, a wireless data communication network 300 is illustrated in accordance with one embodiment. As an option, the present network 300 may be implemented in conjunction with features from any other embodiment listed herein, such as those described with reference to the other FIGS., such as FIG. 1-2. However, such network 300 and others presented herein may be used in various applications and/or in permutations which may or may not be specifically described in the illustrative embodiments listed herein. Further, the network 300 presented herein may be used in any desired environment. Thus FIGS. 3A-3C (and the other FIGS.) may be deemed to include any possible permutation.

As shown in FIG. 3A, the wireless data communication network 300 includes an evolved Node B (eNB) 302, a Mobility Management Entity (MME) 304, and a gateway module 306. Depending on the approach, the gateway module 306 may implement a Packet Data Network Gateway (PGW) protocol, a Mobility Management Entity (MME) protocol, or any other type of protocol which would be apparent to one skilled in the art after reading the present description. Moreover, the eNB 302 may serve as a communication base station for the network 300, as would be appreciated by one skilled in the art after reading the present description. In some approaches the eNB 302 may further implement cognitive radio, e.g., as will be described in further detail below.

Each of the eNB 302, the MME 304, and the gateway module 306 are preferably in communication with each other, e.g., as represented by the dashed lines in FIG. 3A. Any two of the eNB 302, the MME 304, and the gateway module 306 may be coupled to each other by a wireless connection, e.g., WiFi, Bluetooth, a cellular network, etc.; a wired connection, e.g., a cable, a fiber-optic link, a wire, etc.; etc., or any other type of connection which preferably allows for communication therebetween. Accordingly, information, data, commands, requests, etc., may be sent therebetween. The gateway module 306 is depicted as also being connected to the internet. Thus, the eNB 302 and/or the MME 304 may be able to communicate over the internet 308 through the gateway module 306.

Looking now to FIG. 3B, a mobile phone (e.g., UE) 310 attempts to connect to the wireless data communication network 300 through the eNB 302, e.g., by sending a request. Upon being connected to the network 300 for a first time, the mobile phone 310 is assigned a default bearer 312. As mentioned above, a bearer may include a set of network parameters (e.g., such as channel and/or spectrum band information) which may be used to determine how information is sent from and/or to the UE corresponding thereto. As would be appreciated by one skilled in the art after reading the present description, certain channels and/or spectrum bands may be reserved for certain types of communication requests. Accordingly, the network communication connection afforded by a given bearer may be defined by a channel and spectrum band. Moreover, it follows that in some approaches the mobile phone 310 (e.g., UE) may be configured to receive and/or transfer communication resources such as channel and/or a spectrum band information, e.g., as would be appreciated by one skilled in the art after reading the present description. In some approaches the mobile phone 310 may also implement cognitive radio, e.g., as will be described in further detail below.

The relationship between the mobile phone 310 and the default bearer 312 may be static in that the default bearer 312 remains assigned to the mobile phone 310 so long as the mobile phone 310 remains attached to the eNB 302. However, additional default bearers (not shown) may be assigned to the mobile phone 310 depending on the approach.

The default bearer 312 may also be tuned to offer a "best effort service" in that an achievable bit rate of the default bearer 312 is not guaranteed for all situations. Moreover, each default bearer has a different (e.g., unique) internet protocol (IP) address which corresponds thereto. It follows that the mobile phone 310 is able to use the default bearer 312 assigned thereto to selectively direct information in order to perform various network-based processes, e.g., such as access a website, send and/or receive text messages, conduct a phone call, etc.

Looking to FIG. 3C, a dedicated bearer 314 is also assigned to the mobile phone 310. While the bit rate of the default bearer 312 is not guaranteed for all situations, the dedicated bearer 314 may have a more certain (e.g., defined) bit rate. Accordingly, the dedicated bearer 314 may be implemented in order to improve end user experience for applications which involve additional real time traffic and/or services, such as video streaming, Voice over IP (VoIP), video calling, etc. In other words, the dedicated bearer 314 may provide a dedicated data passageway which is used to facilitate one or more data-intensive and/or specific network traffic.

The dedicated bearer 314 acts as an additional bearer on top of the previously established default bearer 312. Moreover, the dedicated bearer 314 does not include an IP address which is different than the IP address which corresponds to the default bearer 312. Accordingly, the dedicated bearer 314 is linked to a previously established default bearer (e.g., default bearer 312). Depending on the approach, the dedicated bearer 314 may be a Guaranteed Bit Rate (GBR) bearer, or a non-GBR bearer. Dedicated bearers may also use traffic flow templates (TFT) to give special treatment to specific network dependent services, e.g., as would be appreciated by one skilled in the art after reading the present description.

As mentioned above, wireless data communication network technology, such as 4G broadband cellular network technology, provides an architecture which allows for communication between various types of UE having wireless functionality. For instance, mobile devices which are coupled to a wireless data communication network are able to transfer information between each other in the form of text messages, voice (phone) calls, emails, etc. Accordingly, 4G broadband cellular network technology may be used by network 300 in order to achieve at least some of the functionality described above.

Under general circumstances, UE which attaches to a wireless data communication network to perform a given task is assigned a default bearer having a set of network parameters which determines how information sent from and/or to the UE is processed. However, for conventional data communication network technology, this bearer assignment process is static. Thus, once the task has been completed and/or the corresponding processes have been terminated, the bearer is de-allocated and returned to a pool before potentially being re-allocated to other UE. As a result, the bearer re-allocation process implemented in conventional products is subjected to network and/or system delays. According to an example, a specific UE email service and on-demand voice channel may be assigned to a default bearer channel in a conventional data communication network. However, once the email application is closed, or the phone call corresponding to the voice channel is terminated, the resources (channel) allocated to the specific UE is de-allocated and returned to a pool of available bearer channels before those same resources may be re-allocated to another UE. This is essentially caused by the software controlled switching (either "0" or "1") network which is implemented to terminate and instantiate the bearer channels to various UE.

Again, this process of returning resources to a pool prior to being re-allocated as seen in conventional products is undesirable as it subjects user requests to unnecessary network and/or system delays, bandwidth shortages, network outages, etc. The conventional disadvantages caused by these delays are particularly apparent in time-sensitive situations. For example, UE which are attempting to respond to medical emergencies or similar types of situations may simply be unable to deal with these conventional delays.

In sharp contrast to the foregoing shortcomings experienced by conventional products, various ones of the approaches included herein are able to package communication channel(s) along with expiry information which may be seamlessly handed-over between different UE in a given wireless data communication network. Moreover, some of the approaches herein may actually be able to determine the context associated with different UE requests, thereby further increasing the efficiency by which communication resources may be used, e.g., by transferring the resources between UE having related content (e.g., dealing with similar situations) in an effort to predict and prepare for future requests, as will be described in further detail below.

Figure 4:
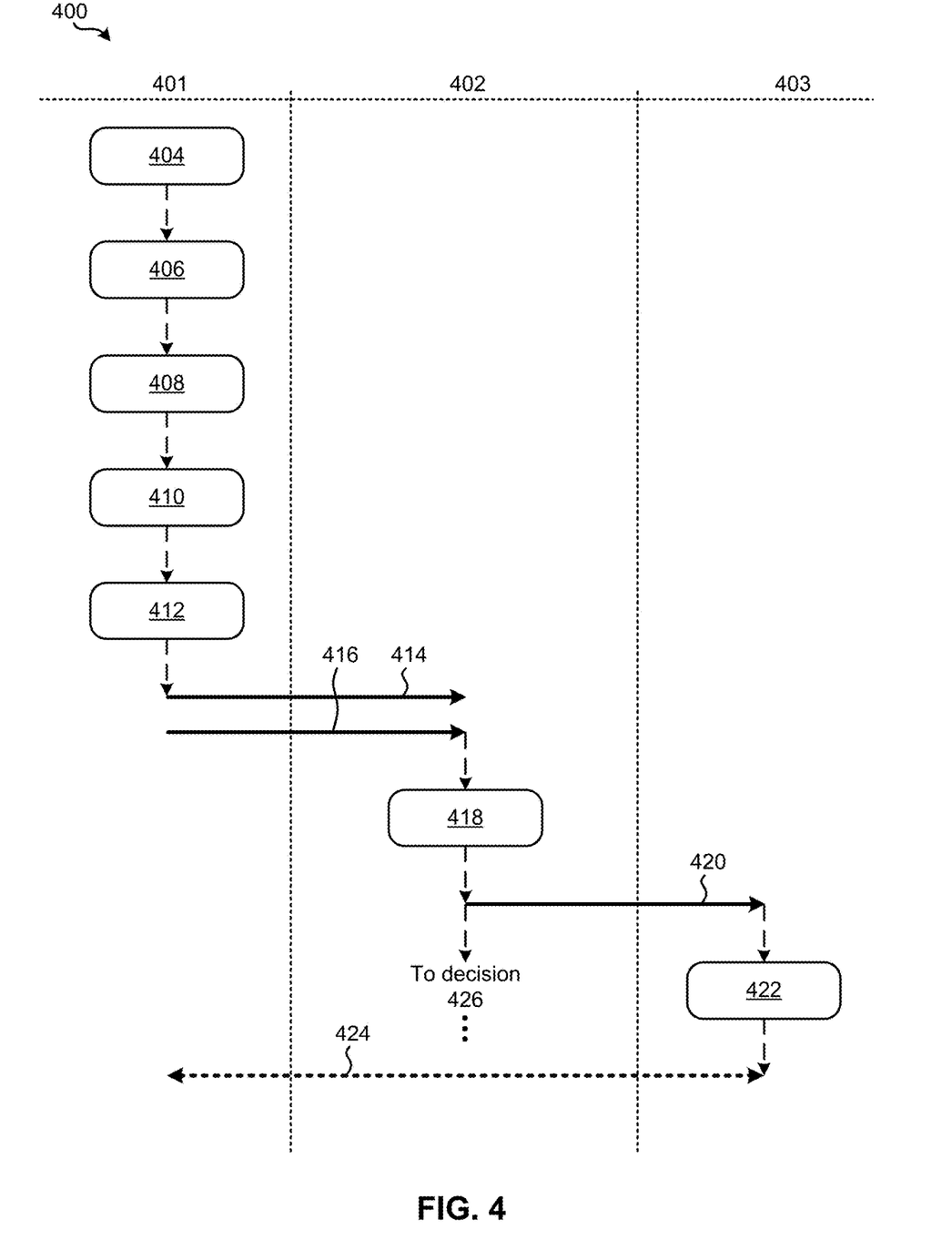
FIG. 4 is a flowchart of a method, in accordance with one embodiment.

Now referring to FIG. 4, a flowchart of a computer-implemented method 400 for handing-over communication resources between different UE is shown according to one embodiment. The method 400 may be performed in accordance with the present invention in any of the environments depicted in FIGS. 1-3C, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, each of the nodes 401, 402, 403 shown in the flowchart of method 400 may correspond to one or more processors positioned at a different location in a wireless data communication network. Moreover, each of the one or more processors are preferably configured to communicate with each other.

In various embodiments, the method 400 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 4 includes different nodes 401, 402, 403, each of which represent one or more processors, controllers, computer, etc., positioned at a different location in a wireless data communication network. For instance, node 401 may include one or more processors which are electrically coupled to a UE of a wireless data communication network (e.g., see 310 of FIGS. 3B-3C above). Node 402 may include one or more processors which are electrically coupled to a base station and/or other management components included in a wireless data communication network (e.g., see eNB 302, MME 304, and/or gateway module 306 of FIGS. 3A-3C above). Moreover, node 403 may include one or more processors which are electrically coupled to another UE of a wireless communication network, which may be an intended participant of the communication resources sent from node 401, e.g., as will be described in further detail below. Accordingly, commands, data, requests, etc. may be sent between each of the nodes 401, 402, 403 depending on the approach. Moreover, it should be noted that the various processes included in method 400 are in no way intended to be limiting, e.g., as would be appreciated by one skilled in the art after reading the present description. For instance, data sent from node 401 to node 402 may be prefaced by a request sent from node 402 to node 401 in some approaches.

As shown, operation 404 of method 400 is performed at node 401 and includes initiating a communication request. As previously mentioned, operation node 401 may include one or more processors which are electrically coupled to a UE (e.g., see 310 of FIGS. 3B-3C above). Accordingly, the communication request may be initiated by a UE. A communication request may be initiated in response to detecting a situation in which a communication channel will be desired in order to perform one or more communication-based operations. For instance, a communication request may be initiated in response to detecting that a call has been/is going to be placed, a message has been/is going to be sent, a specific communication-intensive application has been/is going to be opened, etc. It follows that method 400 may be initiated in response to experiencing any of a number of different conditions depending on the approach.

It follows that in some approaches initiating a communication request may be performed in response to predicting a future demand. Accordingly, method 400 may be able to cognitively predict potential network demands. These predictions may be made by continuously monitoring current network use, user information gathered from various UE connected to the network, applying prediction algorithms, analyzing historical data for patterns, etc.

From operation 404, method 400 proceeds to operation 406 which includes collecting contextual information associated with the initiated communication request. Again, a communication request may correspond to any of a number of different communication-based operations. Different types of communication-based operations may involve different types and/or amounts of information which may be used in order to perform the communication request. Thus, by collecting the contextual information, it may be subsequently used in the process of establishing a communication connection which accurately corresponds to the given situation and may even predict a future demand.

Depending on the type of communication-based operation(s) which correspond to the communication request initiated in operation 404, the contextual information collected in operation 406 may vary. For instance, in different approaches the contextual information collected may include speech data, messaging data, calendar data, location data, etc. The different types of information may be collected using different types of components. For instance, speech data may be collected using a microphone which is capable of capturing and storing audible signals which are loud enough to detect. In other approaches, location data may be collected using a location enabled receiver (e.g., GPS receiver), while calendar data may be collected by analyzing emails, appointment information, meeting invites, scheduled plans, etc. Accordingly, in some approaches the types of contextual information collected may depend on the components (e.g., detectors) which are implemented in and/or on the particular UE.

In preferred approaches, cognitive radio is used to collect the contextual information. Accordingly, the UE which initiated the communication request may implement cognitive radio in some approaches. Cognitive radio is a form of wireless communication in which a transceiver can intelligently detect which communication channels are currently in use, and which channels are not. The two main types of cognitive radio include full cognitive radio and spectrum-sensing cognitive radio. Full cognitive radio takes into account all parameters that a wireless node or network can be aware of, while spectrum-sensing cognitive radio may be used to detect channels in the radio frequency spectrum. Cognitive radio may further use this gathered information to utilize available communication resources (e.g., channels) while also avoiding interrupting channels which are currently being used. This optimizes the use of available radio-frequencies (RFs) across the spectrum while minimizing interferences with other users.

Cognitive radio may be able to determine channel use information by implementing a hybrid technology involving software defined radio (SDR), e.g., as applied to spread spectrum communications. Accordingly, in some approaches cognitive radio may be able to function as a transceiver which is able to determine its geographic location, identify and/or authorize a user corresponding thereto, encrypt and/or decrypt signals, sense (e.g., detect) neighboring wireless UE (e.g., devices) in operation, adjust output power and/or modulation characteristics, etc. It should also be noted that "radio" is in no way intended to be limited to the context of mobile devices. Rather, cognitive radio may be implemented in any appliance which is capable of connecting to the internet, e.g., such as a base station.

The contextual information may be collected following the initiation of the communication request, thereby desirably providing an updated and accurate representation of UE and/or network settings as they currently exist. However, in other approaches the contextual information may be systematically collected over time (e.g., according to a collection schedule) and stored in memory, sent to a storage location, etc. Accordingly, at least some of the contextual information collected in operation 406 may have been previously collected and stored in memory for future use (e.g., predictions).

Operation 408 further includes identifying a context of the communication request by analyzing the contextual information. In other words, operation 408 may include using the collected contextual information to develop a better understanding of the communication request and the steps that may be involved with satisfying it. In some approaches an importance of the communication request may also be identified. Referring to the present description, an "importance" of the communication request may signify an urgency of the communication request, a sensitivity of the content (subject matter) in the communication request, a security level associated with the data included in the communication request, etc. Thus, an importance of the communication request may correspond closely to a context of the communication request.

Looking to operation 410, method 400 includes using the context of the communication request to calculate an expiry time which corresponds to the communication request. As mentioned above, method 400 involves processes which may be used to predict future demands, and hand-over communication resources between different UE according to such predictions. These processes differ significantly from those implemented in conventional products which merely react to demands as they arise using a common resource pool, as method 400 allows for communication resources to be transferred between different UE directly in order to prepare for predicted demands. In other words, communication resources may be allocated seamlessly to UE which method 400 has predicted will experience a demand for such resources. This allows for communication requests to be processed much more quickly and efficiently when they actually arise than achievable for conventional products which merely implement communication resource pools as described above.

Although the approaches included herein enable communication resources to be allocated directly to UE which correspond to future predicted demands, situations may arise where the receiving UE may not actually implement the communication resources right away or even at all. In other words, the predictions made may be wrong in some instances. For instance, user delays, unintentionally initiated communication requests, altered objectives, etc. may cause delays in implementing the communication resources. It is generally undesirable for communication resources to be allocated in anticipation of a request and then not actually used, as performance of other outstanding requests may be postponed as a result, thereby leading to system latency. However, it is also unreasonable to assume that communication resources will always be implemented immediately upon being provided in response to a communication request. For instance, UE which issued the communication request may experience equipment (e.g., component) delays, low software throughput, etc. Accordingly, a tolerable amount of delay during which the communication resources may not be used before further action is taken may be determined for the given situation.

According to some approaches, an expiry time (e.g., amount of delay) may correspond to an importance of the communication request. In such approaches, communication requests which correspond to more critical situations, e.g., such as emergency situations, high priority events, a user which pays for higher performance services, etc. may be assigned an expiry time (e.g., delay) which is longer than an expiry time assigned to communication requests which correspond to relatively less critical situations, e.g., general emails, non-time sensitive text messages, general web browsing, etc.

Referring still to FIG. 4, operation 412 includes identifying one or more identities which correspond to the communication request initiated in operation 404. Identities which "correspond to" a communication request may include information which represents one or more of the parties, the specific UE (e.g., devices) involved, the account holders, etc., which are involved with, or will be involved with, the communication request. For example, a communication request initiated in response to predicting that a phone call will be placed from a mobile phone in response to the occurrence of an event may include identifying the individual and/or entity which placed the call, as well as the one or more individuals and/or entities which the call is intended for, e.g., based on the subject matter of the call. According to an example, which is in no way intended to limit the invention, cognitive radio implemented in a mobile phone may be able to collect location information, voice signals, email information, etc. indicating that a corresponding user is at the hospital. Accordingly, operation 412 may include using this gathered information to identify the individuals in the user's emergency contact list, such that communication resources may be allocated accordingly in anticipation of calls being made to those individuals. It follows that identifying the one or more identities corresponding to the communication request may assist in the process of satisfying the communication request, e.g., by forming a communication connection with the one or more intended parties.

Accordingly, looking to operation 414, the contextual information, the identified one or more identities, and the expiry time is sent to the one or more processors at node 402. As mentioned above, node 402 may include one or more processors which are electrically coupled to a base station and/or other management components included in a wireless data communication network (e.g., see eNB 302, MME 304, and/or gateway module 306 of FIGS. 3A-3C above). Accordingly, in some approaches operation 414 may include sending the contextual information, the identified one or more identities, and the calculated expiry time to a base station. In some approaches the base station may implement cognitive radio, e.g., in order to achieve any of the functionality described above with respect to cognitive radio. Moreover, in some approaches a channel and/or spectrum band corresponding to the communication request may also be sent to the one or more processors at node 402. See operation 416. As mentioned above, information pertaining to a channel and/or spectrum band may be used to actually conduct the communication request. Accordingly, information pertaining to the channel and/or spectrum band may serve as communication resources which are sent in association with the communication request.

Thus, upon receiving the various types of information sent from node 401 in operations 414 and 416, the one or more processors at node 402 may further use the information in order to fulfil the communication request. For instance, operation 418 includes packaging the expiry time with the communication resources received in operations 414, 416. By packaging the expiry time and the communication resources together, the two may be sent as a single packet of information to the identities (e.g., information which represents one or more of the parties, the specific UE involved, the account holders, etc.) identified in operation 412 as corresponding to the communication request.

Accordingly, operation 420 further includes pro-actively passing (e.g., sending) the packaged expiry time and communication resources to devices which correspond to each of the one or more identities identified in operation 412. It should be noted that although operation 420 is only depicted as passing the packaged expiry time and communication resources to a single node (e.g., UE), the packaged information may be sent over a network to any desired number of UE at any number of different locations. It follows that the UE to which the packaged information is sent are each coupled to the same wireless data communication network. For example, each of the UE may be connected to a same LTE wireless communication network. Accordingly, the communication resources sent in the packaged information may correspond to an LTE wireless communication network.

Upon receiving the packaged expiry time and communication resources, the one or more processors at node 403 may actually use the received information to connect to the device which originally initiated the communication request in operation 404. See operation 422. According to some approaches, the UE at node 403 may use the channel and/or spectrum band information to establish a bearer between node 403 and node 401. Thus, a bearer 424 is illustrated as being formed between node 403 and node 401, where the bearer 424 may be used to selectively direct information therebetween in order to perform various network-based processes, e.g., such as sending and/or receiving text messages, conducting a phone call, performing a video conference, etc. In such situations, the demands which were previously predicted based on the gathered contextual information and/or other available information ended up being accurate. By preemptively providing communication resources, a network is desirably able to reduce communication delays, increase network throughput, avoid bandwidth shortages, etc.

However, certain situations may arise in which the communication resources sent in operation 420 are not used to establish a connection with the device which originally initiated the communication request within the expiry time allotted. Accordingly, node 402 is shown as determining whether any of the devices corresponding to each of the one or more identities have used the communication resources to establish a connection within the expiry time. See decision 426. In other words, decision 426 includes determining whether node 403 has used the communication resources received from node 402 to establish a communication connection with node 401 within the given expiry time. According to some approaches, decision 426 may be made based on whether an indication is received from node 403 within the expiry time which signifies that a connection has been made with node 401. Thus, in some approaches node 403 may notify node 402 when a communication connection has been established (not shown).

With continued reference to FIG. 4, method 400 includes freeing the communication resources in response to determining that none of the devices corresponding to each of the one or more identities have used the communication resources to establish a connection with node 401 within the expiry time. For instance, operation 428 includes sending one or more instructions back to node 401 that the communication resources be freed. Moreover, operation 430 includes sending one or more instructions to recall the freed communication resources to a common pool. Upon being returned to a common pool, the communication resources may be re-distributed in accordance with future communication demands, e.g., according to any of the approaches described herein. It should also be noted that operations 428, 430 may be performed after the communication resources have been used according to the demand, and are no longer in use.

FIG. 4 is shown as proceeding to operation 432 from operation 430, whereby Method 400 may end. Similarly, method 400 is shown as jumping to operation 432 from decision 426 in response to determining that the communication resources have been used within the expiry time to establish a connection with node 401. However, it should be noted that although method 400 may end upon reaching operation 432, any one or more of the processes included in method 400 may be repeated in order to process subsequently initiated communication requests. In other words, any one or more of the processes included in method 400 may be repeated for additional communication requests which may be initiated.

According to an in-use example, which is in no way intended to limit the invention, cognitive radio may be responsible for terminating and initiating communication channels to various UE while managing the spectrum allocation. The UE may also be enabled with cognitive radio and thereby able to identify the context of various communication situations. In such a communication environment, UE may identify a "medical emergency" which is thereby reported to cognitive radio. In response, cognitive radio may allocate an emergency spectrum band for anticipated communication requests corresponding to this medical emergency, thereby reducing delay in establishing communication connections. Moreover, performance may be further enhanced by flexibly transferring the allocated communication channels to different UE which is related and in demand of these communication resources.

Accordingly, various ones of the embodiments included herein are able to identify the context (along with a corresponding importance) of different communication requests by parsing the related status, conversation, operations, etc. Based on the context, related identities (e.g., involved parties and/or parties which will be involved) may also be identified. For example, speech tokenization and/or part-of-speech tagging may be implemented, e.g., as would be appreciated by one skilled in the art after reading the present description.

Various information including a type of UE, network generation information, details corresponding to the channels associated with the UE, the spectrum band used by the UE, etc. may be collected. Moreover, the collected information may be further sent to proposed framework at a base station relay, e.g., as described above. Based on the information received at the base station relay, collections of associated channels or spectrum bands used by the UE which initiated the communication request may be packaged with expiry times, and proactively passed to any parties identified as being related to the initiating UE. Depending on the approach, the communication information and/or expiry time may be sent to one, select ones, some, or all of the UE determined to be related to each other based on anticipated demand and/or predicated priority. Upon receiving the token, the channels or spectrum bands may be used to establish a communication connection.

It follows that various ones of the embodiments included herein are able to achieve frameworks which are able to package communication resources along with expiry information which are seamlessly handed-over to different UE having related contextual information in a wireless data communication environment, e.g., such as LTE. Doing so significantly improves the efficiency by which communication requests are satisfied, not only in terms of performance-based data, but also in terms of network resources consumed in the process of doing so. Moreover, these improvements are achieved as a result of predicting future demands, and preemptively allocating communication resources in correspondence with such predictions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   receiving, by the computer, information, wherein the information includes:
      an expiry time which corresponds to a communication request; and
      communication resources associated with the communication request, wherein the communication resources include a channel and/or a spectrum band which correspond to the communication request;
   packaging, by the computer, the expiry time with the communication resources; and
   passing, by the computer, the packaged expiry time and communication resources to devices which correspond to each of one or more identities associated with the communication request.

2. The computer-implemented method of claim 1, wherein the information is received from user equipment.

3. The computer-implemented method of claim 2, comprising:
   determining, by the computer, whether any of the devices which correspond to each of the one or more identities have used the communication resources to establish a connection with the user equipment within the expiry time;
   freeing, by the computer, the communication resources in response to determining that none of the devices which correspond to each of the one or more identities have used the communication resources to establish a connection with the user equipment within the expiry time; and
   recalling, by the computer, the freed communication resources to a common pool.

4. The computer-implemented method of claim 2, wherein the user equipment is a mobile phone.

5. The computer-implemented method of claim 1, wherein the information includes contextual information associated with the communication request, wherein the contextual information is selected from the group consisting of: speech data, messaging data, and calendar data.

6. The computer-implemented method of claim 5, wherein the expiry time is calculated using the contextual information.

7. The computer-implemented method of claim 1, wherein the computer is included in a base station, wherein the base station includes cognitive radio.

8. The computer-implemented method of claim 1, wherein the communication resources correspond to a long-term evolution (LTE) wireless communication network.

9. A computer-implemented method, comprising:
   identifying, by the computer, a context of a communication request by analyzing contextual information that is associated with the communication request;
   using, by the computer, the context of the communication request to calculate an expiry time which corresponds to the communication request;
   identifying, by the computer, one or more identities which correspond to the communication request; and
   sending, by the computer, the identified one or more identities, and the expiry time to a base station.

10. The computer-implemented method of claim 9, wherein the contextual information associated with the communication request is selected from the group consisting of: speech data, messaging data, and calendar data.

11. The computer-implemented method of claim 9, wherein cognitive radio is used to collect the contextual information.

12. The computer-implemented method of claim 9, wherein the computer is included in user equipment, wherein the user equipment is configured to receive and transfer communication resources, wherein the communication resources include a channel and/or a spectrum band.

13. The computer-implemented method of claim 12, wherein the user equipment is a mobile phone.

14. The computer-implemented method of claim 9, wherein the communication request corresponds to a long-term evolution (LTE) wireless communication network.

15. The computer-implemented method of claim 9, comprising:
sending, by the computer, a channel and/or spectrum band corresponding to the communication request to the base station.

16. A computer program product comprising a computer readable storage medium having program instructions embodied therewith, wherein the computer readable storage medium is not a transitory signal per se, the program instructions readable and/or executable by a processor to perform a method comprising:
receiving, by the processor, information from user equipment, wherein the information includes:
an expiry time which corresponds to a communication request; and
communication resources associated with the communication request, wherein the communication resources include a channel and/or a spectrum band which correspond to the communication request;
packaging, by the processor, the expiry time with the communication resources; and
passing, by the processor, the packaged expiry time and communication resources to devices which correspond to each of one or more identities associated with the communication request.

17. The computer program product of claim 16, the program instructions readable and/or executable by the processor to perform the method comprising:
determining, by the processor, whether any of the devices which correspond to each of the one or more identities have used the communication resources to establish a connection with the user equipment within the expiry time;
freeing, by the processor, the communication resources in response to determining that none of the devices which correspond to each of the one or more identities have used the communication resources to establish a connection with the user equipment within the expiry time; and
recalling, by the processor, the freed communication resources to a common pool.

18. The computer program product of claim 16, wherein the user equipment is a mobile phone, wherein the processor is included in a base station, wherein the base station and the mobile phone each include cognitive radio.

19. The computer program product of claim 16, wherein the expiry time is calculated using contextual information, wherein the contextual information is selected from the group consisting of: speech data, messaging data, and calendar data.

20. The computer program product of claim 16, wherein the communication resources correspond to a long-term evolution (LTE) wireless communication network.

* * * * *